United States Patent
Lee

(10) Patent No.: US 8,078,704 B2
(45) Date of Patent: Dec. 13, 2011

(54) PROVISIONING OF A SERVICE ENVIRONMENT USING WEB SERVICES

(75) Inventor: M. Brian Lee, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1279 days.

(21) Appl. No.: 11/786,994

(22) Filed: Apr. 12, 2007

(65) Prior Publication Data

US 2008/0253542 A1    Oct. 16, 2008

(51) Int. Cl.
    *G06F 15/177*    (2006.01)
(52) U.S. Cl. ........ 709/221; 709/201; 709/219; 709/222; 709/226
(58) Field of Classification Search .......... 709/201, 709/219, 221, 222, 226
    See application file for complete search history.

(56) References Cited

U.S. PATENT DOCUMENTS

| | | | |
|---|---|---|---|
| 7,506,059 B2* | 3/2009 | Mulligan | 709/230 |
| 7,584,281 B2* | 9/2009 | Bernardin et al. | 709/226 |
| 7,870,568 B2* | 1/2011 | Bernardin et al. | 719/328 |
| 2007/0083588 A1* | 4/2007 | Keller et al. | 709/202 |
| 2008/0307408 A1* | 12/2008 | Saldhana | 717/173 |

OTHER PUBLICATIONS

S. Durvasula et al., "SOA Practitioners' Guide, Part 1, Why Services-Oriented Architecture?," pp. 1-18, Sep. 15, 2006.
L. F. Cabrera et al., "An Introduction to the Web Services Architecture and Its Specifications," Version 2.0, pp. 1-53, Oct. 2004.
http:\\java.sun.com/j2ee/1.3/docs/tutorial/doc/Overview4.html, "J2EE Containers," pp. 1-2 (at least as early as Mar. 29, 2007).
Wikipedia, definition for "Web service," pp. 1-4 (at least as early as Feb. 12, 2007).
Wikipedia, definition for "Service-oriented architecture," pp. 1-11 (at least as early as Feb. 12, 2007).
Wikipedia, definition for "Business Process Execution Language," pp. 1-5 (at least as early as Feb. 12, 2007).
T. Andrews et al., "Business Process Execution Language for Web Services," Version 1.1, pp. 1-136 (May 5, 2003).

* cited by examiner

Primary Examiner — Michael Won

(57) ABSTRACT

To perform service provisioning in an infrastructure, a provisioning system receives a request to provision a service environment for an application. In response to the request, the provisioning system employs web services to configure resources of the infrastructure for the application. The provisioning system defines interactions between the web services, and provides the service environment based on the configuring performed by the web services.

20 Claims, 3 Drawing Sheets

PROVISIONING OF A SERVICE ENVIRONMENT USING WEB SERVICES

BACKGROUND

In many enterprises, such as businesses, educational organizations, government agencies, many applications can share a common resource, such as a server farm in a data center. To provision virtual environments in the shared infrastructure for such applications (where a virtual environment refers to some partition of the shared infrastructure for the respective application), information technology (IT) personnel typically have to perform manual configuration of hardware and/or software resources of the shared infrastructure. Manually configuring an environment for an application is a time-consuming and labor-intensive process that can take many days or even weeks. Also, making changes to such an environment is also a relatively long process.

To support manual configuration of environments in a large enterprise, a large number of IT personnel typically has to be available. However, cost constraints have reduced the number of IT personnel that are available to an enterprise, which makes timely deployment of relatively large numbers of applications difficult.

BRIEF DESCRIPTION OF THE DRAWINGS

Some embodiments of the invention are described with respect to the following figures.

DETAILED DESCRIPTION

Figure 1:
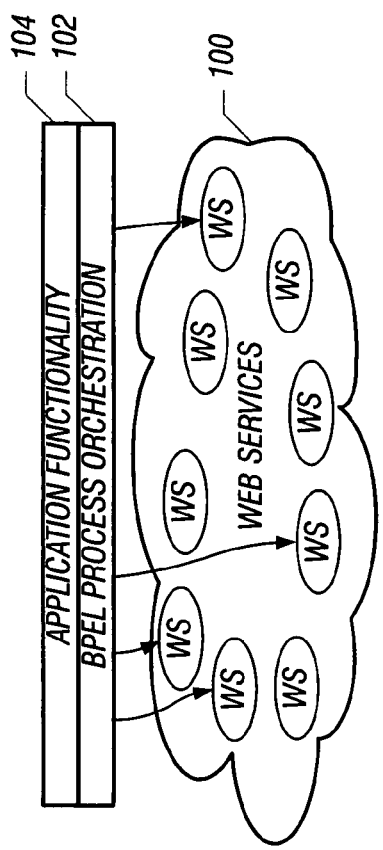
FIG. 1 is a functional block diagram of various components provided to enable automatic configuration of an environment for an application, according to an embodiment.

In accordance with some embodiments, to provision (create or modify) service environments (also referred to as "virtual environments" or more simply "environments") for multiple applications that share a common infrastructure, such as a server farm in a data center, an automated environment provisioning technique is used. The automated environment provisioning technique allows a user to simply fill out a form (or otherwise provide user input), such as in a graphical user interface (GUI), and to click on a control element at the GUI (e.g., a GUI button) provided by a provisioning system, to initiate the automatic environment provisioning procedure.

An "application" refers to a use of a system or technology, which in this case is the shared infrastructure (including software and/or hardware components). Example applications include accounting applications, human resource applications, customer support applications, customer order applications, and so forth. In a given enterprise (such as a business, educational organization, or government agency), there may be many possible applications that share the common infrastructure. An "environment" refers to a partition of the shared infrastructure that is allocated to the application. Provisioning an environment refers to creating a combination of configurations of the shared infrastructure for the corresponding application.

In response to activation of the control element provided by the provisioning system, the automated service provisioning procedure is started. The service provisioning procedure is performed by modular services (e.g., web services) and a business logic layer that defines interactions among the modular services. The modular services and business logic layer are part of the provisioning system.

The output of the provisioning procedure is an automatically generated service environment, which is in the form of a container. A "container" refers to an interface between an application component (or application components) and the underlying infrastructure. The container includes input/output variables as well as the configurations of the underlying infrastructure allocated to the corresponding application. Once the container is defined, an application component (or application components) can be deployed into the container. In one implementation, the container can be a J2EE (Java Platform Enterprise Edition) container. J2EE provides a platform-independent, Java-centric environment for developing, building and deploying web-based applications. The J2EE platform includes a set of services, application programming interfaces (APIs), and protocols that provide the functionality for developing multi-tiered, web-based applications.

The automated service provisioning procedure can reduce the amount of time involved in provisioning a service environment for an application (compared to manual configurations performed using conventional techniques). As a result, IT personnel involvement in deploying applications on a shared infrastructure is reduced so that usage of IT personnel is made more efficient to reduce costs.

In some embodiments, the modular services of the provisioning system are "web services." A "web service" is a self-contained application that performs predefined functions, from simple requests to complicated business processes. In some embodiments, a service-oriented architecture (SOA) defines the framework in which web services are able to support functionalities requested by users (which can be an actual human user or a software process, such as another service or some application). According to SOA, independent web services have defined interfaces that can be called to perform tasks in a standard way, without the service having prior knowledge of the calling application, and without the calling application having to know how the service actually performs the service's tasks. In the service-oriented architecture, the basic unit of communication is a message, such that services interact with each other by passing messages.

Thus, according to some embodiments, web services for performing provisioning tasks are arranged according to SOA. Interaction between the web services are supported by a business logic layer (discussed further below).

A provisioning task that can be performed by a web service is a configuration task, where a "configuration" refers to a setup of hardware and/or software components of the shared infrastructure. Configuring hardware and/or software components may include one or more of the following: allocating disk space or file system space to an application, configuring a hardware load balancer, configuring a workload manager, creating an account (e.g., a UNIX application account), creating a WebLogic domain (where a WebLogic domain includes one or more WebLogic server instances and associated resources, and where a WebLogic server is an application server that is in the middle tier of a multi-tier architecture of software components), and other tasks. A virtual environment created by the provisioning system for a particular application includes multiple configurations produced by the various web services.

The provisioning system according to some embodiments includes two main types of components: (1) web services that encapsulate work units that are devoid of business logic, where these work units change little over time and are based on open standards that can be written in many different languages; and (2) an organizing framework or glue that coordinates the web services and facilitates the execution of business logic. "Business logic" refers to a set of business rules that define how the web services are to interact. For the provisioning system, the business logic refers to the set of rules that define how provisioning is to be performed. The organizing framework or glue is provided by a business logic layer.

FIG. 1 illustrates an example provisioning system that includes several layers, including a web services layer 100 that includes various web services labeled as "WS." A business logic layer 102 is provided above the web services layer 100 to enable coordination between the web services and to provide the business logic relating to provisioning of environments for applications. Another layer illustrated in FIG. 1 is an application functionality layer 104 above the business logic layer 102. The application functionality layer 104 defines a further set of rules, such as rules for checking whether the container is properly set up.

According to an embodiment, the business logic layer 102 is implemented using the Business Process Execution Language ("BPEL") process, where BPEL is a business process modeling language that is executable. A BPEL process is able to integrate relatively complex interactions among web services. Basically, a BPEL process wires the web services together, and contains logic with conditional statements to decide which web services are to be invoked to perform desired tasks. In some embodiments, a BPEL process is able to keep a detailed audit trail of all activities, such that an enterprise can later review the audit trail to identify problems when problems occur. A BPEL process is itself a web service that has a defined interface that is invocable by other services.

BPEL processes are expected to change relatively frequently, whereas web services are expected not to change (or to change much less frequently). Changes to the BPEL process can be made by business analysts (which are the business users) so that the work of making changes to BPEL processes do not have to be performed by IT personnel. Consequently, IT personnel can focus on providing web services that are durable and pervasive.

To decide what functionality a web service should have, three criteria can be used: frequency of change, BPEL process capability, and ownership. The functionality of a web service is primarily defined by the interface or variables available for the web service to act upon. If a variable is expected to be changed frequently (e.g., more than once a year), then the variable is pushed into the higher-level orchestration process (the BPEL process).

The second criterion is related to the limitations of functionality of the BPEL process. If a desired functionality cannot be handled by the BPEL process, then the functionality is pushed to a web service instead of being performed by the BPEL process.

The third criterion is ownership. If it is desirable for a functionality to be controlled by a particular enterprise, then the functionality can be pushed out of a web service and into the BPEL process.

Figure 2:
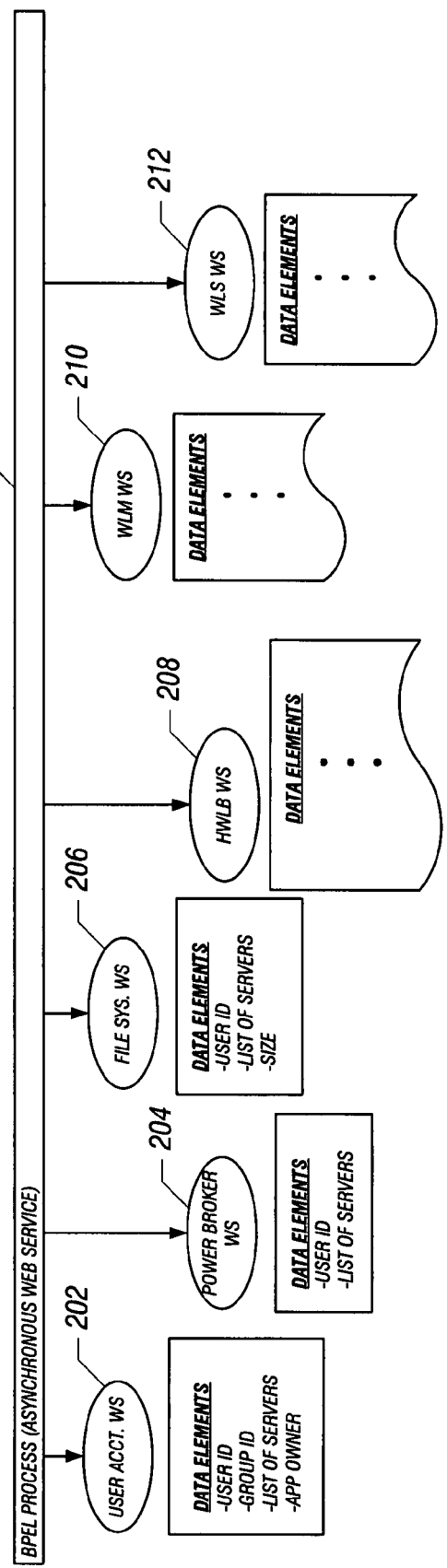
FIG. 2 illustrates example web services to perform the work units involved in automatically configuring the environment of an application, in accordance with an embodiment.

FIG. 2 shows various examples of web services that are coupled to a BPEL process 200. The example web services include a user account web service 202, a power broker web service 204, a file system web service 206, a hardware load balancer (HWLB) web service 208, a workload manager (WLM) web service 210, and a WebLogic server (WLS) web service 212. The various web services 202-212 in FIG. 2 perform various work units to enable the provisioning of a service environment.

The user account web service 202 sets up a user account (or user accounts) for a particular application. The web service 202 assigns values to variables 214 associated with the user account web service 202, where the example variables 214 of FIG. 2 include a user identifier (ID), a group ID, and other variables. Note that in other examples, other variables can be associated with the user account web service 202, and with the other web services 204-212.

The power broker web service 204 sets permissions (e.g., file access permissions) for the user accounts of the particular application. The file system web service 206 allocates storage space (e.g., disk space) for the particular application. The HWLB web service 208 defines load balancing for the particular application, where the load balancing defines how requests are forwarded between various servers allocated to the particular application. The WLM web service 210 defines workload management between applications by virtualizing the shared infrastructure—for example, the WLM web service 210 can allocate half a CPU (central processing unit) to a particular application. The WLS service 212 creates a WebLogic domain for the particular application.

Figure 3:
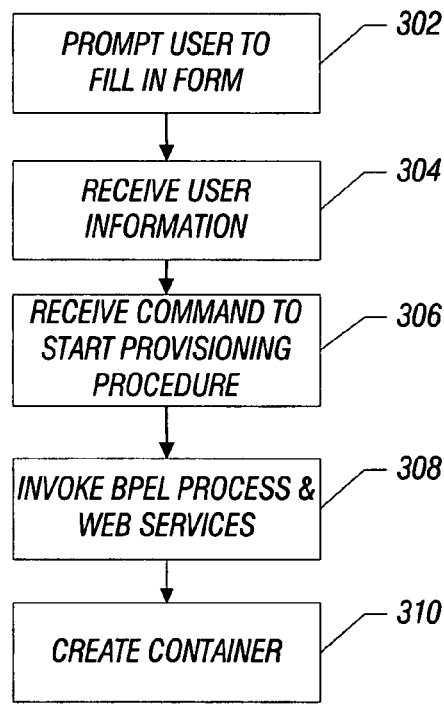
FIG. 3 is a flow diagram of an automated provisioning procedure to create the environment for an application on a shared infrastructure, according to an embodiment.

FIG. 3 shows a process of provisioning a service environment for a particular application in accordance with an embodiment. The provisioning process is performed by the provisioning system, which can be a software tool executed in a computer. Initially, the provisioning system prompts (at 302) a user to fill in a form (or to input variables associated with provisioning an environment in another manner). The form can be in a graphical user interface (GUI) screen with various fields that ask various questions, including questions such as the name of the particular application, the geographic location of a particular application, amount of disk space that should be allocated to the application, type of network connectivity desired (e.g., connectivity to an intranet or to the external Internet), third party software desired, the relative size of the application, and other information.

The information filled in by the user is received (at 304) by the provisioning system. Note that the provisioning system can also derive certain variables based on responses from users. For example, a user may be asked if the user wants a small, medium, or large container. Based on the response, the provisioning system can translate "small," "medium," or "large" to a specific allocation of hardware and/or software resources.

The provisioning system can receive (at 306) a command indicating that the automated provisioning procedure is to be started. The command can be in response to a click of a GUI element, selection of a GUI pull-down menu item, a command entered into a command line prompt, and so forth.

The BPEL process and web services of the provisioning system are then invoked (at 308) so that the web services can perform the configurations of the shared infrastructure for defining the service environment. The BPEL process and web services create (at 310) a container (e.g., a J2EE container) into which application component(s) of the particular application can be deployed.

Figure 4:
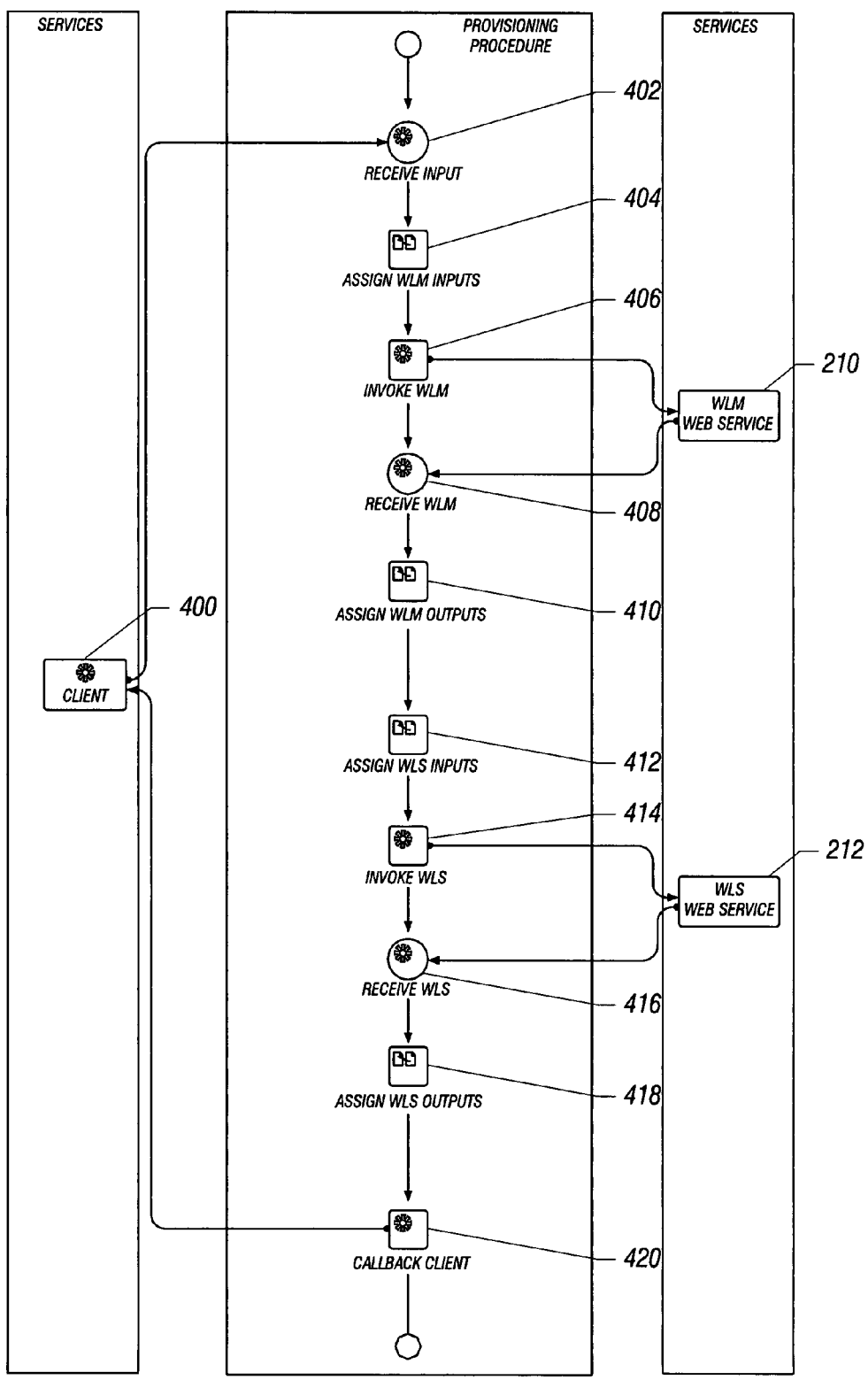
FIG. 4 illustrates in slightly greater detail the tasks of the automated provisioning procedure, according to an embodiment.

FIG. 4 illustrates an example provisioning procedure that involves two web services: the WLM web service 210 and the WLS web service 212. A client service 400 (which can be a web service) provides a user interface (such as a GUI) to allow the user to enter various variables associated with a particular application to be deployed onto the shared infrastructure. The input variables are received (at 402) by the provisioning procedure (as are derived variables). Next, the provisioning procedure assigns (at 404) a subset of the received input variables for the WLM web service 210, and the WLM web service is invoked (at 406) with the assigned subset of variables.

The output generated by the WLM web service 210 is received (at 408) by provisioning procedure, which then assigns (at 410) output variables from the received output of the WLM web service 210 to include in a report.

The provisioning procedure next assigns (at 412) another subset of the received input variables for the WLS web service 212. The provisioning procedure then invokes (at 414) the WLS web service 212, and receives (at 416) output generated by the WLS web service 212. Output variables from the received output are then assigned (at 418) for inclusion in a report.

The provisioning procedure then performs (at 420) a callback of the client 400, where the callback provides an indication to the client that the provisioning procedure is complete.

Figure 5:
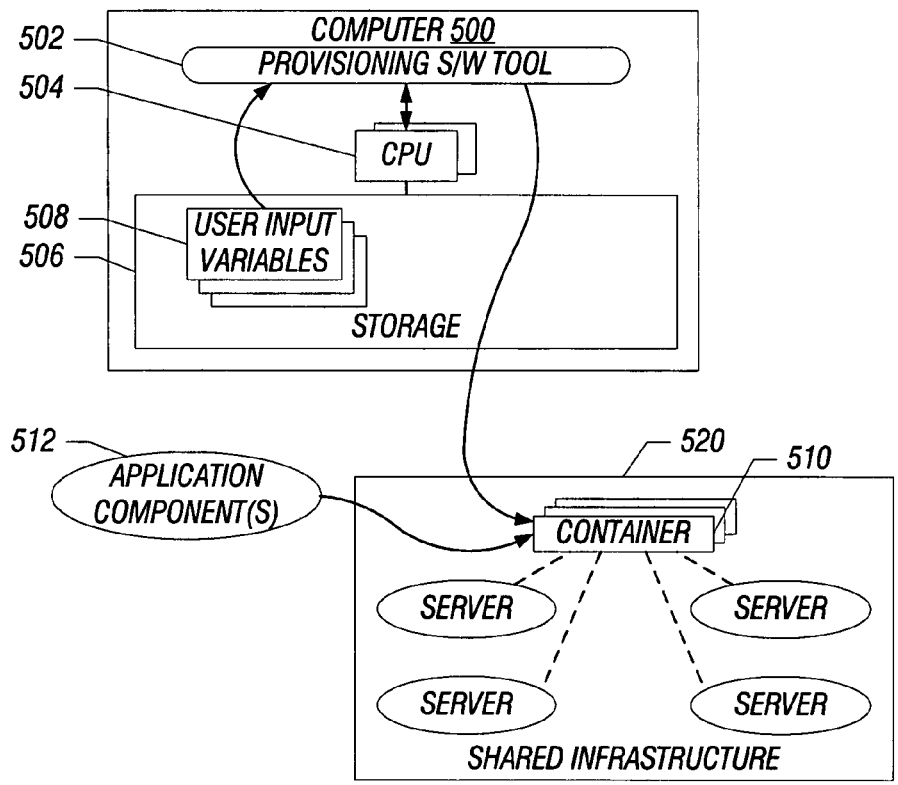
FIG. 5 is a block diagram of a computer to perform tasks associated with the automated provisioning procedure according to an embodiment.

FIG. 5 illustrates a computer 500 that includes a provisioning software tool 502 to provide the provisioning system (web services layer 100, BPEL process layer 102, and application functionality layer 104 of FIG. 1) discussed above. The provisioning software tool 502 is executable on one or more CPUs 502. The computer 500 includes a storage 506 that stores sets 508 of user input variables received from various clients for respective applications to be deployed onto a shared infrastructure 520. The storage 506 can also store derived variables.

Based on the sets 508 of user input variables (and derived variables), the provisioning tool 502 creates containers 510 that correspond to different applications. Note that the containers 510 depicted in FIG. 5 are actually logical concepts (and not physical entities). A container is a logical allocation of resources defined based on one or more variables, such as CPU allocation, memory allocation, network allocation, etc. Application component(s) 512 can be deployed into each container 510. Each container 510 represents a virtual environment in the shared infrastructure 520, which in one example can be a server farm having plural servers (e.g., application servers, web servers, database servers, etc.).

Note that automated provisioning procedure discussed above can be applied to either create a new service environment for an application, or to modify an existing environment of the application.

Instructions of software described above (including provisioning software tool 502, web services, BPEL process, and so forth) are loaded for execution on a processor (such as one or more CPUs 504 in FIG. 5). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of service provisioning in an infrastructure, comprising:
    receiving, by a provisioning system, requests to provision service environments for respective applications that share the infrastructure;
    in response to each of the requests, the provisioning system employing web services to configure resources of the infrastructure for the corresponding application;
    the provisioning system defining interactions between the web services; and
    the provisioning system providing the service environments based on the configuring performed by the web services, wherein the service environments include respective partitions of the infrastructure allocated to the applications, and wherein each of the service environments includes a respective combination of configurations of the resources of the infrastructure.

2. The method of claim 1, wherein providing the service environments comprises creating the service environments.

3. The method of claim 1, wherein providing the service environments comprises modifying the service environments.

4. The method of claim 1, wherein defining the interactions is performed by a Business Process Execution Language (BPEL) process.

5. The method of claim 1, wherein the web services are modular.

6. The method of claim 1, wherein configuring the resources of the infrastructure with the web services comprises configuring the resources of the infrastructure with web services that perform work units that are devoid of business logic, and
    wherein defining the interactions between the web services is performed with a business logic layer.

7. The method of claim 1, wherein configuring the resources of the infrastructure with the web services comprises configuring the resources of the infrastructure with web services of which at least some are written with different software languages.

8. The method of claim 1, wherein receiving a particular one of the requests comprises receiving an indication of a click of a graphical user interface control element.

9. The method of claim 8, wherein receiving the particular request further comprises receiving a form filled with assigned values for variables associated with the corresponding one of the service environments.

10. The method of claim 1, wherein configuring the resources of the infrastructure with the web services comprises at least one of assigning a user account, setting permissions, allocating storage space, configuring a workload manager, and configuring a load balancer.

11. The method of claim 1, wherein providing the service environments comprises creating corresponding containers, wherein each of the containers:
- provides an interface between a respective one of the applications and the infrastructure, and
- includes a corresponding one of the combinations of configurations allocated to the respective application.

12. The method of claim 11, wherein creating the container comprises creating a J2EE container.

13. An article comprising at least one non-transitory computer-readable storage medium embedded with instructions which when executed cause a computer to:
- present a user interface to accept combinations of variables for configuring corresponding virtual environments on a shared infrastructure for respective applications;
- receive the combinations of variables;
- invoke web services to configure resources of the shared infrastructure for each of the applications according to the corresponding received combination of variables; and
- according to the configuring by the web services, provide the virtual environments, wherein the virtual environments include respective partitions of the shared infrastructure allocated to the respective applications, and wherein each of the virtual environments includes a respective combination of configurations of the resources of the shared infrastructure.

14. The article of claim 13, wherein the instructions when executed cause the computer to further provide a business logic layer to define interactions between the web services.

15. The article of claim 14, wherein invoking the web services comprises invoking the web services that are part of a Service-Oriented Architecture.

16. The article of claim 14, wherein the web services are devoid of business logic.

17. The article of claim 13, wherein providing the virtual environments comprises creating corresponding containers, wherein each of the containers:
- provides an interface between a respective one of the applications and the shared infrastructure, and
- includes a corresponding one of the combinations of configurations allocated to the respective application.

18. A computer comprising:
a processor; and
software executable on the processor to:
- receive requests to configure service environments of an underlying infrastructure for respective applications that share the underlying infrastructure;
- invoke web services to generate corresponding combinations of configurations of the underlying infrastructure for the respective applications;
- define interactions between the web services using a business logic layer; and
- provide the service environments based on the corresponding combinations of configurations, wherein the service environments include respective partitions of the underlying infrastructure allocated to the applications, and wherein each of the service environments includes a respective combination of configurations of the underlying infrastructure.

19. The computer of claim 18, wherein the web services generate the combinations of the configurations by assigning a user account, setting permissions, allocating storage space, configuring a workload manager, and configuring a load balancer.

20. The computer of claim 18, wherein the service environments include corresponding containers, wherein each of the containers:
- provides an interface between a respective one of the applications and the underlying infrastructure, and
- includes a corresponding one of the combinations of configurations allocated to a respective application.

* * * * *